(12) United States Patent
Adams et al.

(10) Patent No.: US 7,072,757 B2
(45) Date of Patent: Jul. 4, 2006

(54) FUEL CONTROL SYSTEM

(75) Inventors: Robert E. Adams, Edelstein, IL (US); Douglas M. Chevalier, Morton, IL (US); Jeffery T. Fischer, Brimfield, IL (US); Robert C. Griffith, Jr., Chillioothe, IL (US); Bin He, Peoria, IL (US); Diane M. Laugel, Mason City, IL (US)

(73) Assignee: Caterpillar Inc., Peoria, IL (US)

( * ) Notice: Subject to any disclaimer, the term of this patent is extended or adjusted under 35 U.S.C. 154(b) by 543 days.

(21) Appl. No.: 10/166,336

(22) Filed: Oct. 29, 2001

(65) Prior Publication Data

US 2003/0217721 A1    Nov. 27, 2003

(51) Int. Cl.
*B60T 7/12*    (2006.01)
(52) U.S. Cl. .................. 701/103; 701/105; 123/179.17
(58) Field of Classification Search ................ 701/103, 701/105; 123/480, 497, 179.16, 179.17
See application file for complete search history.

(56) References Cited

U.S. PATENT DOCUMENTS

| | | | |
|---|---|---|---|
| 3,935,851 A | 2/1976 | Wright et al. | |
| 4,209,833 A | 6/1980 | Krupp et al. | |
| 4,363,097 A | 12/1982 | Amano et al. | |
| 4,480,616 A * | 11/1984 | Takeda | 123/406.52 |
| 4,554,634 A | 11/1985 | Shinoda | |
| 4,565,173 A | 1/1986 | Oshiage et al. | |
| 4,590,563 A * | 5/1986 | Matsumura et al. | 701/105 |
| 4,594,987 A * | 6/1986 | Wataya et al. | 123/494 |
| 4,602,324 A | 7/1986 | Fujawa et al. | |
| 4,732,130 A * | 3/1988 | Suzuki | 123/480 |
| 4,764,727 A | 8/1988 | McConchie, Sr. | |
| 4,790,277 A | 12/1988 | Schechter | |
| 4,884,033 A | 11/1989 | McConchie Sr. | |
| 4,895,120 A * | 1/1990 | Tobinaga et al. | 123/335 |
| 5,016,181 A * | 5/1991 | Hayashida | 701/112 |
| 5,459,664 A | 10/1995 | Buckalew | |
| 5,765,995 A | 6/1998 | Springer | |
| 5,794,586 A * | 8/1998 | Oda et al. | 123/305 |
| 5,803,043 A * | 9/1998 | Bayron et al. | 123/335 |
| 5,819,196 A | 10/1998 | Holmes et al. | |
| 5,964,811 A | 10/1999 | Ishii et al. | |
| 6,029,630 A * | 2/2000 | Toyohara et al. | 123/480 |
| 6,168,699 B1 * | 1/2001 | Frenkel et al. | 204/403.14 |
| 6,202,614 B1 * | 3/2001 | Grob et al. | 123/179.3 |
| 6,213,820 B1 * | 4/2001 | Kanno | 440/1 |
| 6,425,362 B1 * | 7/2002 | Kanno | 123/179.16 |
| 6,434,453 B1 * | 8/2002 | Kuroda et al. | 701/22 |

FOREIGN PATENT DOCUMENTS

| | | |
|---|---|---|
| GB | 2 335 055 A | 9/1999 |
| JP | 56027064 A | 3/1981 |
| JP | 61101663 | 5/1986 |
| JP | 1056960 A | 3/1989 |

* cited by examiner

*Primary Examiner*—Willis R. Wolfe
*Assistant Examiner*—Johnny H. Hoang
(74) *Attorney, Agent, or Firm*—J. J. Stanley; Liell & McNeil

(57) ABSTRACT

An apparatus and method of controlling an engine by determining the state of an ignition command device and the speed of an engine and operating a fuel pump during a predetermined period in response to the ignition command device being in a predetermined state and the speed being substantially zero.

11 Claims, 2 Drawing Sheets

US 7,072,757 B2

FUEL CONTROL SYSTEM

TECHNICAL FIELD

This relates generally to fuel control systems for engines and more particularly, to an apparatus and method of sensing engine speed and an ignition command device and controlling a fuel pump.

BACKGROUND

Fuel control systems are widely known and available on diesel engines. Many of these systems control a pump such that fuel is being pumped to the fuel injector or other similar device whenever the key switch is in the on position. These systems include automated engine-powered pump control systems such as that disclosed in U.S. Pat. No. 5,765,995 to Springer.

Known systems permit damage to the pump if no fuel is present, drain batteries if the key switch is on and the engine is not running and fail to prime the engine after fuel filters are changed. Moreover, the many various components, intricacies of the electrical connections, and complexity of the control system may increase manufacturing costs as well as maintenance and other owning and operating costs.

An embodiment is directed to overcoming one or more of the problems as set forth above.

SUMMARY OF THE INVENTION

An engine having a control system is provided. The engine has a moveable component and includes an ignition signal, a speed signal, a controller and a fuel pump. The ignition signal is indicative of a state of an ignition command device. The speed signal is indicative of a speed of the moveable component. The controller is operable to receive the ignition and speed signals and provide a control signal in response to the speed being substantially zero and the ignition command device being in at least one predetermined state. The fuel pump is responsive to the control signal.

A method of controlling an engine is provided. The state of an ignition command device and the speed of the engine are determined. A fuel pump is operated during a predetermined period in response to the ignition command device being in at least one predetermined state and the speed being substantially zero.

DETAILED DESCRIPTION

Figure 1:
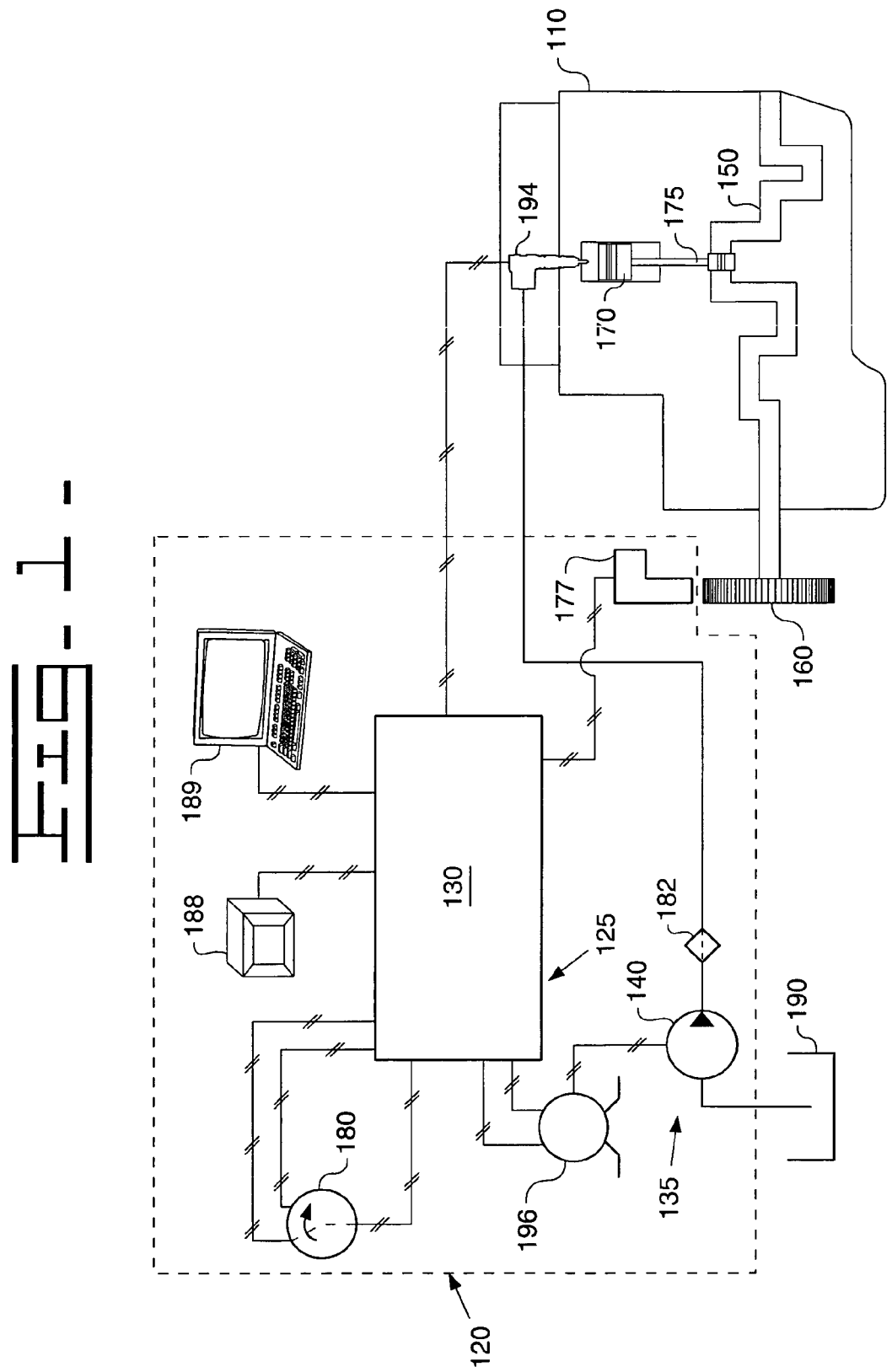
FIG. 1 is a schematic drawing of an embodiment.

Referring to FIG. 1, an engine 110 having a control system 120 is provided. The engine 110 has a speed, ignition signal, speed signal, control means 125 (e.g. controller 130), and means for pumping 135 (e.g. fuel pump 140). As is well known in the art, engine 110 may contain components such as a crankshaft 150 and/or flywheel 160. The speed may be the rotational speed of the crankshaft 150 and/or flywheel 160. However, engines 110 may include other moving components, for example, piston 170, rod 175 or any other component that changes during operation of the engine 110 (e.g. camshaft, gear or fuel delivery system component). It should be appreciated that the speed of movement of such components may be utilized as the speed without departing from the scope of the invention as claimed.

The speed signal is indicative of a representative speed of movement of an engine component. Preferably, the control system 120 includes a speed sensor 177 operable to provide the speed signal. Speed sensor 177 may be one or more of any sensor, other apparatus, technology or technique known in the art for determining the speed of movement of a component and would particularly include the use of a fluidic, pneumatic, mechanical or magnetic, sonic or optical or other electronic sensor and the like positioned adjacent a flywheel 160 or other moving component and capable of providing a signal indicative of the speed of movement of the component (e.g. rotational speed of flywheel 160).

The ignition signal is indicative of a state of an ignition command device 180. The ignition command device 180 has at least two states and advantageously has at least one of an off, run, and start state. The ignition command device 180 could be one or more of any of a number of manual or electronic input devices such as switches, buttons, touch screens, micro switches, proximity sensors, audio and/or visual sensors or command receivers, and the like, or preferably, a key switch.

The control means 125 is operable to receive the ignition and speed signals and responsively provide a control signal. It should be appreciated by those skilled in the art that the control signal could be any signal including phase, amplitude, voltage and current shifts, including providing power to the pump during a predetermined time. However, it should be appreciated that the predetermined time would vary depending upon a variety of design criteria of the particular size and model engine 110. For example, the means for controlling could be controller 130. Many suitable controllers 130 are known in the art, any one of which could be readily and easily used in connection with an embodiment. Specific program code can be readily and easily written from the flowchart, shown in FIG. 2, in the specific assembly language, source code, or micro code for the selected controller 130. Preferably, the controller 130 is one of many readily available controllers 130 capable of processing numerous instructions. It should be appreciated that controller 130 may include multiple processing units configured in a distributed architecture environment forming a system.

Figure 2:
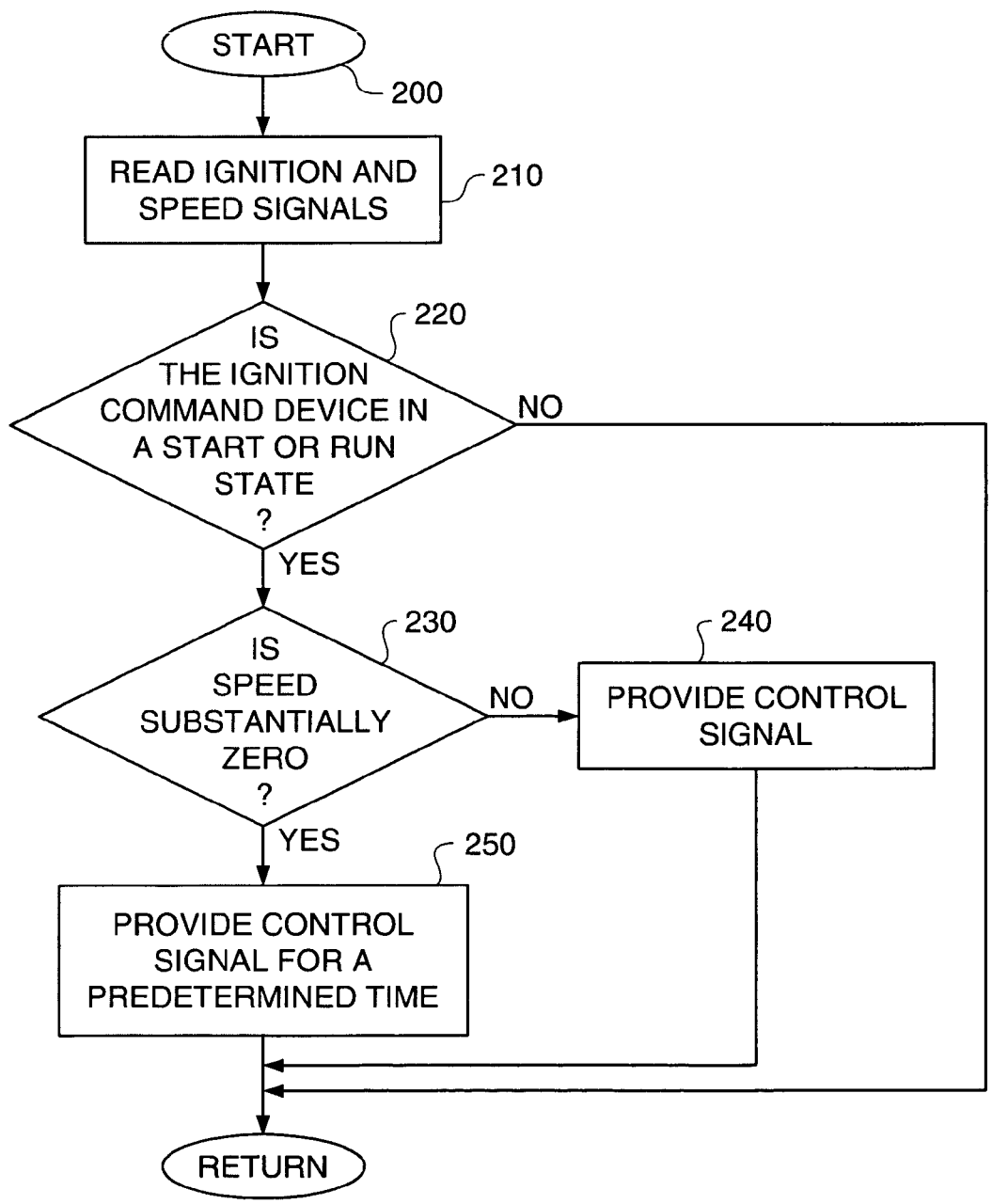
FIG. 2 is a flowchart of a control algorithm of an embodiment.

Referring to FIG. 2, program control begins in first block 200. From first block 200, program control passes to second block 210.

In second block 210, the controller 130 reads the ignition and speed signals. From second block 210, program control passes to first decision block 220.

In first decision block 220, the controller 130 determines whether the ignition command device 180 is in a start or run state. If the ignition command device 180 is not in a start or run state, program control returns to the main program. Else, program control passes to second decision block 230.

In second decision block 230, the controller 130 determines whether the speed is substantially zero. Substantially zero means the speed is within a range including zero, the range includes values that would allow a determination that the engine 110 is not starting or running. If the speed is not substantially zero, program control passes to third block 240. Else, program control passes to fourth block 250.

In fourth block 250, controller 130 provides the control signal during a predetermined time. From fourth block 250, program control returns to the main program.

Returning back to third block 240, the controller 130 provides the control signal. From third block 240, program control returns to the main program.

The logic of FIG. 2 may be performed frequently enough to provide the desired resolution and time responsiveness for avoiding unnecessary draining of batteries, damage to the pump 140 when there is no fuel available, and to prime the engine 110 after changing a fuel filter 182. However, those skilled in the art appreciate that aspects of the control logic could be determined at various frequencies depending on factors like battery size and capacity, pump specifications, fuel line lengths, fuel filter specifications, fuel injector specifications, engine 110 specifications, and the like, without deviating from the invention as defined by the appended claims.

Advantageously, at least one of data link interface 188 and a service tool interface 189 is provided for allowing a person access to at least one of the state of the ignition command device 180, the speed, and the state of the pump 140. The interfaces may be any data screen, LCD, CRT, visual display device, keyboard, touch screen, voice actuation device, proximity actuation device, video device, optical device, computer device, or the like singularly or in combination.

Referring back to FIG. 1, the means for pumping 135 receives the control signal and is responsive to the control signal and is operable to provide fuel from sump 190 or an other available reservoir of fuel such as a fuel tank. For example, the means for pumping 135 may provide fuel for the duration of the control signal or may provide fuel during a predetermined period after receiving the control signal or until one or more control signals are received. The means for pumping 135 may be fuel pump 140 or any other apparatus or system for providing fuel to a combustion chamber of engine 110. Advantageously, fuel pump 140 provides fuel to a fuel filter 182 and then to a fuel injector 194.

In an embodiment, pump 140 operates during a predetermined period in response to the speed being substantially zero and the ignition command device 180 being in a predetermined state. However, it should be appreciated that the predetermined period would vary in length of time depending upon a variety of design criteria of the particular size and model engine 110. The pump 140 may have a state being at least one of off, on, or on during a predetermined period.

Depending upon certain design criteria and specifications of the controller 130, fuel pump 140 and many other components, it may be advantageous to include a conversion device 196. Conversion device 196 is operable to receive the control signal and responsively provide power to operate pump 140. Conversion device 196 may be any of a number of devices known in the art for receiving a pneumatic, hydraulic, mechanical or preferably electronic control signal and operable to provide power to operate the pump 140. However, the conversion device 196 is preferably at least one of a relay or a solenoid activated valve.

While aspects of the present invention have been particularly shown and described with reference to at least one embodiment, it will be understood by those skilled in the art that various additional embodiments may be contemplated without departing from the spirit and scope of the present invention. For example, a free piston engine 110, an engine 110 not having a crankshaft 150, may be utilized. However, a device or method incorporating such an embodiment should be understood to fall within the scope of the present invention as determined based upon the claims below and any equivalents thereof.

INDUSTRIAL APPLICABILITY

Engines 110 are utilized in a variety of applications such as work machines, off-road trucks, medium and heavy duty trucks, locomotive engines, electric power generation units, marine vessels, and the like. In these applications fuel may be provided to the engine 110 from a variety of sources. These may be tanks in remote locations and other devices which provide fuel.

An embodiment monitors the state of the ignition command device 180 and the engine speed to determine whether the fuel pump 140 should be operated continuously, for a predetermined period or not operated. For example, when the engine 110 is not cranking or running, the speed may be zero and the state of ignition command device 180 may be off, resulting in pump 140 being off. Often, fuel must be filtered prior to use by the engine 110. Therefore, it is not uncommon for fuel filter 182 to need to be changed periodically as part of a regular maintenance and serviceability program for the engines 110. This contributes to periods when no fuel may be available for engine 110. Similarly, it is not uncommon for the engine 110 to continue to run until no more fuel is available to the engine 110. For example, when the power is on but the engine 110 is not running (e.g. testing, engine 110 runs out of fuel, maintenance and priming the fuel system after changing the filter 182), the speed may be zero and the state of the ignition command device 180 may be run, resulting in pump 140 being on for a predetermined period and then off. Thereby, not draining batteries and not damaging the pump when no fuel is available. When the engine 110 is cranking during start up or the engine 110 is running, the speed may not be zero and the state of the ignition command device 180 may be start and or run, resulting in pump 140 being on. Table 1 below summarizes preferred operation and results of the control system 120.

| OPERATING CONDITIONS | STATE OF IGNITION COMMAND DEVICE | SPEED | RESULTING FUEL PUMP STATUS |
|---|---|---|---|
| Engine 110 not cranking or running | OFF | =0 | Pump OFF |
| Power on with engine 110 not running for 1. Testing or maintenance 2. Prime fuel system after filter change | Run | =0 | PUMP ON for predetermined period, then OFF |
| Engine 110 cranking during start up or engine 110 running | Start and/or Run | >0 | Pump ON |
| Machine runs out of fuel and shuts down | Run | =0 | PUMP ON for predetermined period, then OFF |

The apparatus and method of certain embodiments, when compared with other methods and apparatus, may have the advantages of: not draining batteries if the key is on but the engine 110 is not running; not damaging the pump if no fuel is present; priming the engine 110 after changing fuel filters; being used in a timely and efficient manner; and being more economical to manufacture and use. Such advantages are particularly worthy of incorporating into the design, manufacture, and operation of engines 110. In addition, the present invention may provide other advantages that have not been discovered yet.

What is claimed is:

1. An engine having a moveable component, comprising:
    a fuel injector tip positioned in each of a plurality of engine cylinders;
    an ignition command device being operable to deliver an ignition signal representative of a state of the ignition command device, which is indicative of a commanded engine state;
    a speed signal indicative of a speed of the moveable component;
    a controller operable to receive the ignition and speed signals and provide a control signal in response to the speed being substantially zero and the ignition command device being in at least one predetermined state;
    a fuel pump responsive to the control signal;
    wherein the control signal causes the pump to be on for a predetermined period and then off;
    a fuel filter fluidly positioned between the pump and the fuel injector; and
    wherein the predetermined state is at least one of a run state and a start state.

2. The engine of claim 1, wherein the engine has a control system including a speed sensor operable to provide the speed signal and a conversion device operable to receive the control signal and responsively provide power to operate the pump.

3. The engine of claim 2, wherein the conversion device is at least one of a relay or a solenoid activated valve and including at least one of a data link interface and a service tool interface for providing to a person at least one of the state of the ignition command device, the speed, and the state of the pump.

4. The engine of claim 1, wherein the controller includes a maintenance mode in which the ignition command device is in a run state and the engine speed is zero, and the control signal causes the pump to be on for a predetermined period and then off.

5. The engine of claim 1 wherein the controller includes a filter priming mode in which the ignition command device is in a run state and the engine speed is zero, and the control signal causes the pump to be on for a predetermined period and then off.

6. The engine of claim 1 wherein the controller includes a lack of fuel engine shut down mode in which the ignition command device is in a run state and the engine speed is zero, and the control signal causes the pump to be on for a predetermined period and then off.

7. The engine of claim 6, wherein the controller includes a maintenance mode in which the ignition command device is in a run state and the engine speed is zero, and the control signal causes the pump to be on for a predetermined period and then off.

8. The engine of claim 7 wherein the controller includes a filter priming mode in which the ignition command device is in a run state and the engine speed is zero, and the control signal causes the pump to be on for a predetermined period and then off.

9. A method of controlling an engine, comprising:
    controlling individual fuel injectors associated with each of a plurality of cylinders to inject fuel from tips located in the respective cylinders;
    determining a state of an ignition command device, which is indicative of a commanded engine state;
    determining a speed of a moveable component;
    operating a fuel pump during a predetermined period in response to the ignition command device state and the speed determination being substantially zero indicating one of a maintenance mode, a fuel filter priming mode and a lack of fuel shut down mode; and
    deactivating the fuel pump after the predetermined period.

10. The method of claim 9, wherein the predetermined state is at least one of a run state and a start state.

11. The method of claim 10, including providing to a person at least one of the state of the ignition command device, the speed, and a state of the pump.

* * * * *

UNITED STATES PATENT AND TRADEMARK OFFICE
CERTIFICATE OF CORRECTION

| | | |
|---|---|---|
| PATENT NO. | : 7,072,757 B2 | Page 1 of 1 |
| APPLICATION NO. | : 10/166336 | |
| DATED | : July 4, 2006 | |
| INVENTOR(S) | : Adams et al. | |

It is certified that error appears in the above-identified patent and that said Letters Patent is hereby corrected as shown below:

Please amend claims 9-11 to read as follows:

Col. 6,
    9. A method of controlling an engine, comprising:
    controlling individual fuel injectors associated with each of a plurality of cylinders to inject fuel from tips located in the respective cylinders;
    determining a state of an ignition command device, which is indicative of a commanded engine state;
    determining a speed of a moveable component;
    operating a fuel pump during a predetermined period in response to the ignition command device state and the speed determination being substantially zero indicating one of a maintenance mode, a fuel filter priming mode and a lack of fuel shut down mode, and the state of the ignition command device is at least one of a run state and a start state; and
    deactivating the fuel pump after the predetermined period.

10. (cancelled)

Col. 6,
    11. The method of claim 9, including providing to a person at least one of the state of the ignition command device, the speed, and a state of the pump.

Signed and Sealed this

Eleventh Day of September, 2007

JON W. DUDAS
*Director of the United States Patent and Trademark Office*